United States Patent [19]
Britton

[11] 3,777,982
[45] Dec. 11, 1973

[54] DISPENSING DEVICES
[76] Inventor: Anthony Sidney Britton, P.O. Box 11459, Cape Town, Republic of South Africa
[22] Filed: May 23, 1972
[21] Appl. No.: 256,156

[30] Foreign Application Priority Data
May 28, 1971 South Africa.................... 71/3449

[52] U.S. Cl. ............................................. 239/315
[51] Int. Cl. .......................................... B05b 1/18
[58] Field of Search.................. 239/312, 315, 316, 239/317

[56] References Cited
UNITED STATES PATENTS
3,018,969 1/1962 Gentry............................ 239/315 X
1,745,323 1/1930 Coe et al. ....................... 239/317 X
1,991,388 2/1935 Healy.............................. 239/315 X
3,091,402 5/1963 Palmer............................... 239/315

FOREIGN PATENTS OR APPLICATIONS
958,556 5/1964 Great Britain..................... 239/315

Primary Examiner—Allen N. Knowles
Assistant Examiner—John J. Love
Attorney—Larson, Taylor & Hinds

[57] ABSTRACT

The invention discloses a dispensing device including a first housing part having an inlet opening, which is adapted for connection to a liquid supply, and an outlet opening; a second housing part adapted for connection to the first housing part and having an inlet for communication with the outlet opening of the first housing part and further having at least one support member for supporting a block of liquid soluble material, and an outlet opening.

5 Claims, 3 Drawing Figures

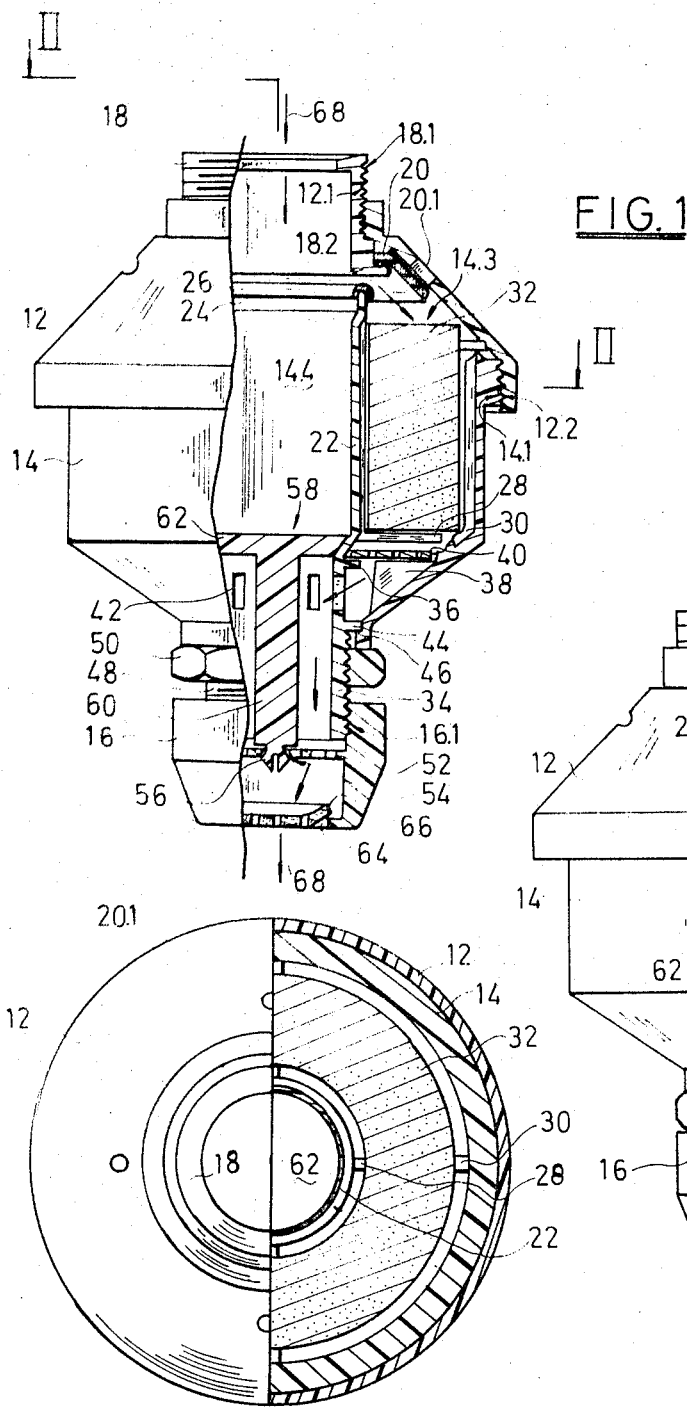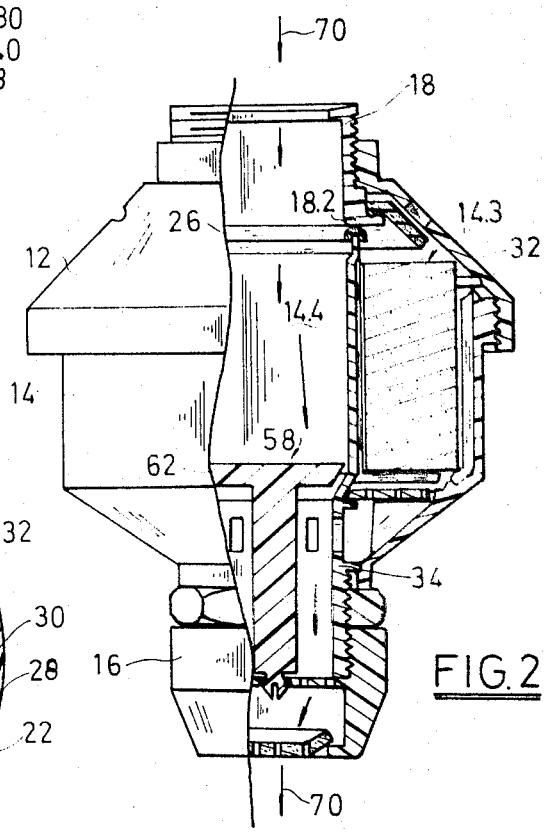
FIG.1
FIG.2
FIG.3

DISPENSING DEVICES

The present invention relates to dispensing devices.

More particularly the invention relates to a dispensing device for dispensing a block of liquid soluble material, e.g., a soap, detergent, shampoo, fertilizer or insecticide, together with a fluid.

According to the invention, a dispensing device includes a first housing part having an inlet opening, which is adapted for connection to a liquid supply, and an outlet opening; a second housing part screw-connected to the first housing part and comprising an outer cylindrical part forming a first chamber, and an inner cylindrical part forming a second chamber, and a common outlet for both the inner and outer cylindrical parts, each chamber having an inlet for communication with the outlet opening of the first housing part and an outlet opening in communication with the common outlet; a resilient sealing ring provided on an upper edge of the inner cylindrical part, the inlet opening to the first chamber being formed by a gap defined between the resilient ring and the first housing part; the second housing part being rotatable for pressing the sealing ring against the first housing part for closing the gap and thus the inlet opening to the first chamber when liquid flow is to take place through the second chamber only; at least one support member in the first chamber for supporting a block of liquid soluble material; and a valve arrangement mounted inside the second housing part and operable from its outside for selectively directing liquid flow to the chambers, the valve arrangement including a valve disc attached to an outlet nozzle, which is screw-connected to the second housing part and which is adapted to be rotatable from an "open position" for opening the outlet of the second chamber, thereby allowing liquid flow to take place through the inner cylindrical part and thus the second chamber, to a "closed position" abutting on a valve seat provided about the outlet of the second chamber for closing it and thus preventing liquid flow to take place through the second chamber.

The first housing part may be cone-shaped.

The device may be provided with an adaptor for connecting the device to a liquid supply, which adaptor is screw-connected to the first housing.

The first housing part may have at least one aeration hole for avoiding the creation of a vacuum in the first housing part.

The invention will now be described by way of example with reference to the accompanying schematic drawings.

In the drawings,

FIG. 1. shows a partial sectional elevation of a dispensing device in accordance with the invention, the device being adjusted to a 'mixing position';

FIG. 2. shows the same elevation as in FIG. 1 but now adjusted to a 'clear position'; and FIG. 3. shows a partial sectional plan view of the device seen along arrows III—III in FIG. 1.

Referring to the drawings, the device 10 includes a top cone-shaped first housing part 12, a central cylindrical second housing part 14, a lower outflow part 16 and an upper inflow adaptor part 18.

The adaptor 18 is provided with external threads 18.1 cooperating with internal threads 12.1 of the housing 12. The adaptor 18 has a lower flange 18.2 on which a resilient circular gasket 20 is fitted for closing off aeration holes 20.1 in the housing 12.

The housing 12 has internal threads 12.2 along its lower edge co-operating with external threads 14.1 of the housing 14.

Inside the housing 14 there is fitted an inner cylindrical housing 22, so that an outer chamber 14.3 and an inner concentric chamber 14.4 are formed. This housing 22 has an upper edge 24 on which a sealing ring 26 is fitted. On its outside it has a number of outwardly extending projection arms 28 which, together with inwardly extending projection arms 30 on the housing 14, form a number of circumferentially spaced support members for supporting a disc shaped water soluble tablet 32.

The housing 22 has narrow bottom cylindrical part 34 along the upper edge of which an outer flange 36 is provided. On this flange 36 and on the inwardly extending projection arms 38 of the housing 14 a screen disc 40 is supported.

The housing part 34 has a number of circumferentially distributed holes 42 for liquid coming from the outer chamber 14.3 to pass through.

It further has a central collar 44 abutting with a complimentary shoulder 46 on the inside of the housing 14. Below the collar 44 the housing part 34 is externally screw threaded as indicated at 48.

A nut 50, screwed on to the threaded section 48, keeps the housing 22 firmly fitted to the inside of the housing 14.

The outflow part 16 has an inner screen disc 52 with a central cone-shaped hole 54. The bottom forked end 56 of a valve member 58 having a pillar 60 carrying a valve disc 62 is fitted through this hole 54. The outflow part 16 is internally screw threaded at 16.1 to engage with the threads 48. The outflow part 16 further has an outflow hole 64 over which a filter element 66 is fitted.

The device 10 is assembled as follows:

1. The gasket 20 is fitted obver the flange 18.2 and then the adaptor 18 is screwed into the housing 12.
2. The sealing ring 26 is fitted to the edge 24 of the housing 22. The housing 22 then is pushed into the housing 14 from above. The screen disc 40 is placed in position, and the nut 50 is applied until the housings 22 and 14 are firmly connected together.
3. The filter 66 is placed over the hole 64 and the outflow part 16 is screwed onto the threaded section 48. Now the valve member 58 is fitted by inserting it with its pillar 60 downwardly until the fork formation 56 passes through the hole 54 and firmly fits the valve member 58 to the screen disc 52.
4. A disc tablet 32 is placed into the first chamber 14.3 formed beween the housings 14 and 22, and then the housing 14 is screwed into the housing 12.

The adaptor 18 is connectable directly or by means of a connecting socket to a water tap, or to a flexible pipe connected to a water tap.

The device 10 in FIG. 1 is in the 'mixing position.' As is shown, the outflow part 16 is screwed to its lowest position so that the valve disc 62 abuts firmly on the inclined valve seat formed by the housing 22. Also the housing 12 is screwed to its lowest position relative to the adaptor 18 so that a gap is present between the sealing ring 26 and the flange 18.2. When the adaptor 18 is connected, e.g., by means of a suitable resilient tube, to a tap, and the tap is opened, water will flow along arrows 68, fill up the inner housing 22, pass through the gap above the sealing ring 26, flow over the tablet 32 and dissolve part of it, flow through the screen 40, the holes 42, the screen 52 and out through the filter 66.

If the water flow is stopped and a vacuum is formed inside the housing 14, this will be broken by the gasket 20 lifting off to allow air to enter through holes 20.1.

For clear water, the device 10 is adjusted to the position shown in FIG. 2. This requires two operations: Firstly the part 16 is turned to move upwardly until abutting against the nut 50. Now the valve disc 62 has lifted leaving a gap between it and the inclined valve seat formed by the housing 22. Water then will flow downwardly as shown by arrows 70.

As an additional precaution, the disc 12 is also rotated relative to the adaptor 18 until the sealing ring 26 presses tightly against the flange 18.2. This ensures that no water can pass over the tablet 32, so that clear water emerges from the outlet 64.

The various parts of the device 10 may be made of suitable plastic material.

The tablet 32 may have various compositions depending on the purpose of use. Such uses are, for instance, washing of domestic articles in kitchens; washing of motorcars or other vehicles; industrial washing applications; washing of persons or animals with special shampoos, etc.; providing fertilisers to plants; providing insecticides to plants or buildings. The device may be connected to a water tap as a permanent stationery accessory, or it may be provided at the end of a hose pipe to be carried around for use wherever required. I claim:

1. A dispensing device including a first housing part having an inlet opening, which is adapted for connection to a liquid supply, and an outlet opening; a second housing part adapted for connection to the first housing part and having a first and a second chamber, each chamber having an inlet for communication with the outlet opening of the first housing part and an outlet opening, the first chamber having at least one support member for supporting a block of liquid soluble material; and a valve arrangement mounted inside one of the first and second housing parts and operable from its outside for selectively directing liquid flow to either or both of the chambers, said valve arrangement including a valve disc attached to an outlet nozzle which is screw-connected to the second housing part and is adapted to be moved from an "open position," in which liquid flow takes place through an inner cylindrical part of said second housing part which forms the second chamber, to a "closed position" abutting on a valve seat provided in the inner cylindrical part for closing the inner part preventing liquid flow to take place through it, said inner cylindrical part having an upper edge provided with a resilient sealing ring above which a gap, forming the inlet opening to the first chamber, is provided, the inner cylindrical part being movable for pressing the sealing ring against an opposite section for closing the gap and thus the inlet opening to the first chamber when liquid flow is to take place through the second chamber only.

2. A device as claimed in claim 1, in which the first housing part is cone-shaped.

3. A device as claimed in claim 1, which is provided with an adaptor for connecting the device to a liquid supply, which adaptor is screw connected to the first housing.

4. A device as claimed in claim 1, in which the first housing part has at least one aeration hole for avoiding the creation of a vacuum in the first housing part.

5. A device as claimed in claim 1, in which the second housing part further comprises an outer cylindrical part forming the first chamber, and a common outlet for both the inner and outer cylindrical parts.

* * * * *